Jan. 31, 1956

C. THOMSON 2,732,930

CONVEYOR BELT CONSTRUCTION

Filed April 6, 1953

INVENTOR
Charles Thomson
by
Stevens, Davis, Miller & Mosher
his ATTORNEYS

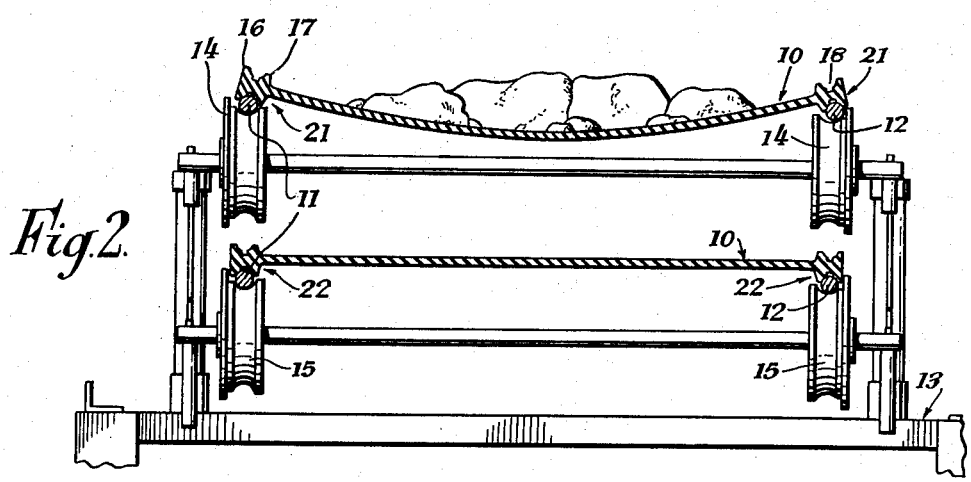
Fig.2.
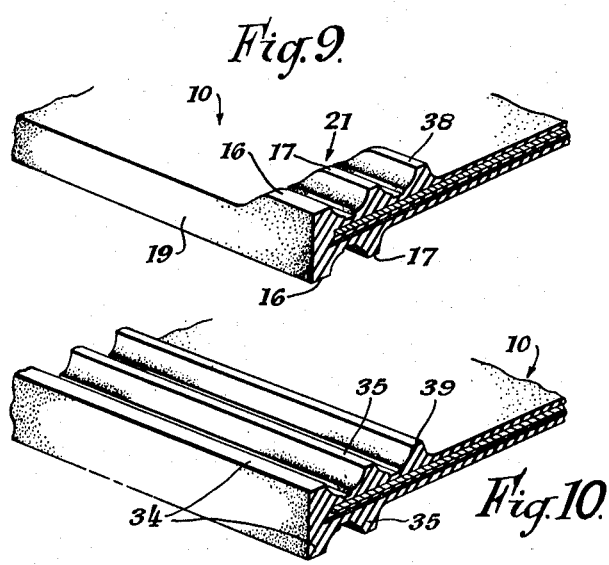
Fig.9.
Fig.10.

Jan. 31, 1956

C. THOMSON 2,732,930

CONVEYOR BELT CONSTRUCTION

Filed April 6, 1953

INVENTOR
Charles Thomson
BY
Stevens, Davis, Miller & Mosher
his ATTORNEYS

Jan. 31, 1956  C. THOMSON  2,732,930
CONVEYOR BELT CONSTRUCTION
Filed April 6, 1953  4 Sheets-Sheet 4

INVENTOR
Charles Thomson
BY
Stevens, Davis, Miller & Mosher
his ATTORNEYS

United States Patent Office 2,732,930
Patented Jan. 31, 1956

2,732,930

CONVEYOR BELT CONSTRUCTION

Charles Thomson, Montreal, Quebec, Canada, assignor to Cable Belt Limited, Inverness, Scotland Application April 6, 1953, Serial No. 346,910

Claims priority, application Great Britain April 22, 1952

2 Claims. (Cl. 198—201)

This invention relates to conveyor belts for use in conveyors of the kind in which the belt is supported and driven by two cable circuits, one on each side of the belt.

The object of the invention is to provide an improved belt for conveyors of this kind.

In a conveyor belt of the kind referred to, according to the present invention the belt is formed of rubber or rubberlike material having embedded therein a textile or other woven reinforcing material and having also embedded in it a series of transversely extending resilient metal rods or bars, cable-engaging means being provided within the width of the belt and being so positioned that the resilient rods or bars extend outwardly across cables engaged by said cable-engaging means.

Further, according to the invention a conveyor belt for a conveyor of the kind referred to has a series of transversely extending resilient metal rods or bars wholly embedded in the material of the said belt, and cable-engaging means formed integral with the belt adjacent its edges, the ends of the resilient rods or bars being so positioned that they lie on the outer sides of the cables on which the belt is supported.

The invention is hereinafter described with reference to the accompanying drawings, in which:

Figure 2 is a transverse sectional view of the conveyor shown in Figure 1;

Figures 9 and 10 are fragmentary perspective views showing modifications of the forms of belt shown in Figures 3 and 6 respectively.

Figure 1:
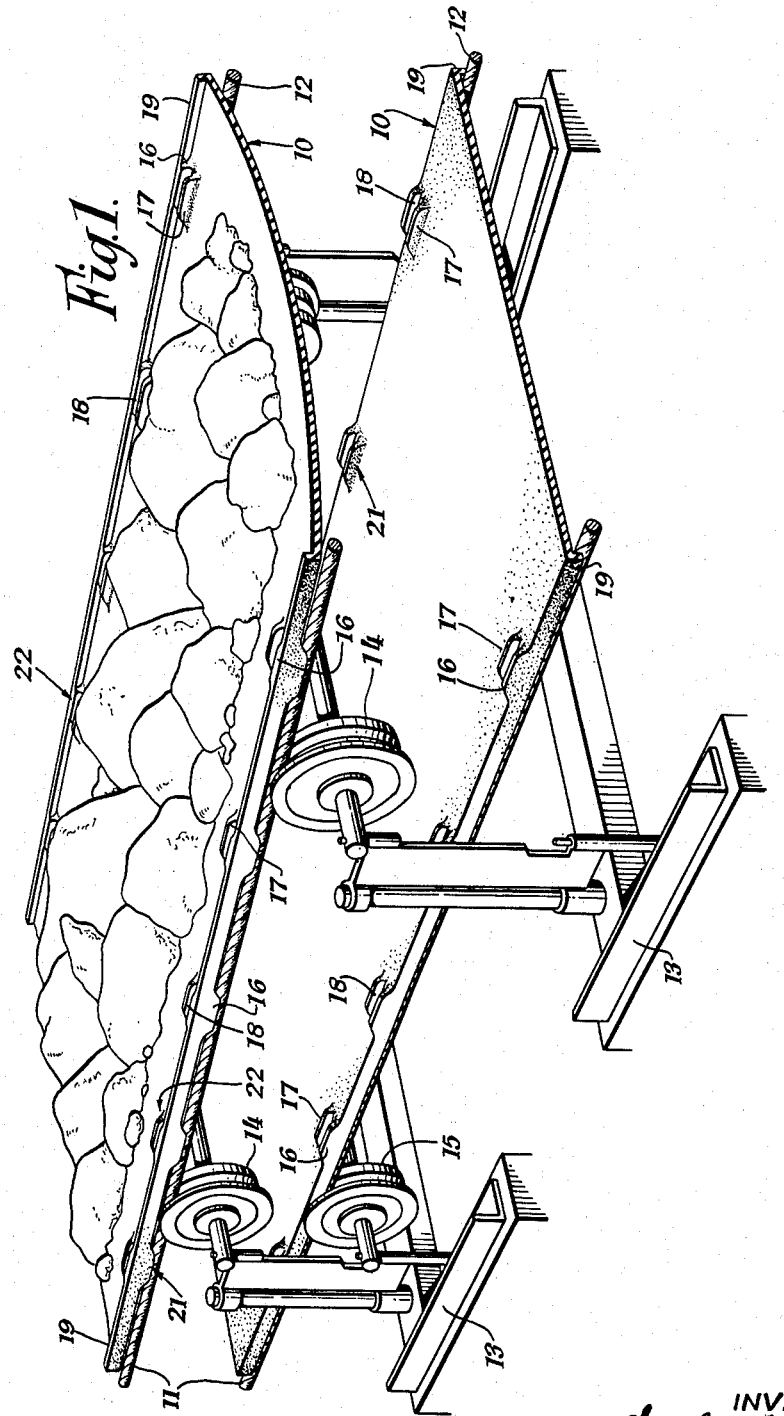
Figure 1 is a perspective view of a part of a conveyor including one form of belt according to the present invention.

Referring first to Figures 1 and 2 of the drawings, the conveyor comprises a belt 10 supported on both its upper or carrying run and its lower or return run by cables, there being two cables 11 and 12, one at each side of the conveyor, and each forming a circuit between head and tail units (not shown). The cables are supported at intervals by pulleys mounted on stands 13, alternate stands 13 supporting two pairs of pulleys so as to support both the upper and the lower runs of the cables, whilst the intermediate stands 13 support only a single pair of pulleys supporting the upper run. The pulleys supporting the upper run of the cable are indicated by the reference 14, and the pulleys supporting the lower run by the reference 15.

The belt 10 is formed at each edge, and on both sides with pairs of lugs each comprising an outer lug 16 and an inner lug 17 defining between them a longitudinally extending notch 18, and on that side of the belt which is uppermost on the upper or carrying run and lowermost on the lower or return run, the lugs 16 at each edge of the belt are joined by a continuous rib 19. The notch 18 between each pair of lugs is adapted to receive one of the cables 11 and 12, and each pair of lugs thus constitutes a cable-engaging member. For convenience of description, each pair of lugs which is on the underside of the belt during the carrying run, that is to say on the side of the belt opposite to the rib 19, will be termed a cable-engaging member 21, whilst each pair of lugs on the other side of the belt will be termed a cable-engaging member 22. On the upper or carrying run, the cable-engaging members 21 engage downwardly with the cables 11 and 12, whilst during the lower or return run the cable-engaging members 22 engage downwardly with the said cables. Any suitable means may be provided at the head and tail ends of the conveyor to reverse the relative positions of the cables and the belt for example the means described in my United States patent application Serial No. 294,373, filed June 19, 1952.

Referring to Figures 3 to 6 of the drawings, which show the consrtuction of the belt 10 shown in Figures 1 and 2, the belt is of uniform thickness, and is moulded from rubber or other flexible and resilient material.

The belt 10 comprises a thick layer 23 and a thinner layer 24 of hard wearing flexible and resilient material, the layer 23 having embedded in it a reinforcement 25 of textile material such as cotton duck. Between the layers 23 and 24 are disposed transverse straps 26 of resilient metal such as spring steel, of substantially rectangular cross-section, and the spaces between the straps 26 are filled, to maintain the uniform thickness of the belt, with flexible and resilient material 27 of a similar nature to that of the layers 23 and 24, but of an inferior quality. The transverse straps 26 and the filling 27 do not extend to the edges of the belt, the edges being formed wholly of the hard-wearing material. On each surface of the belt at a position corresponding to each strap 26 are located a pair of the spaced lugs 16 and 17, the lugs being integral with the belt itself, and defining between them, as above described a longitudinally-extending notch 18. The notch 18 is of arcuate cross-section, having in its base a recess 30 to ensure that the cable is engaged only by the sides of the notch. The rib 19 is also moulded integral with the belt, as shown in Figure 5.

It will be seen that the straps 26 extend across the notches 18 and consequently, when the notches 18 between the lugs at the ends of a strap are engaged with the cables of the conveyor, the ends of the strap are supported directly by the cables, and the straps acts as beams supported at their ends to carry the load on the conveyor. The dimensions and spacing of the straps are so chosen that they deflect to a predetermined extent when the belt is loaded to its maximum capacity with the material for which the conveyor is designed to be used, so that the material carried by the conveyor causes troughing, which increases the carrying capacity of a belt of a given width. The straps 26 are initially straight, so that the belt is flat when unloaded, as shown on the return run in Figure 2. The load is transmitted substantially vertically downwardly to the cables, and exerts no substantial inward pull on the said cables. The spacing between notches 18 engaging the cables at opposite edges of the belt changes slightly when the belt takes up a troughed form due to loading, but the lugs 16 and 17 are sufficiently flexible to accommodate this change without lateral movement of the cables, and there is thus no need to allow for such lateral movement. If desired, however, the pulleys 14 may be provided with treads wide enough to allow limited lateral movement of the cables, thus avoiding the flexing of the lugs.

Figure 3:
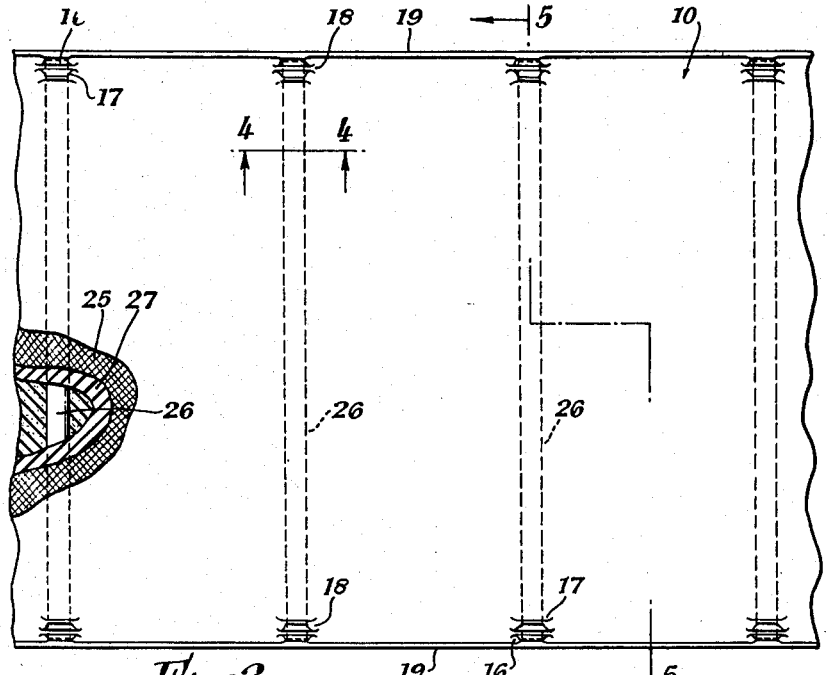
Figure 3 is a plan view of a part of the belt shown in Figures 1 and 2.
Figure 4:
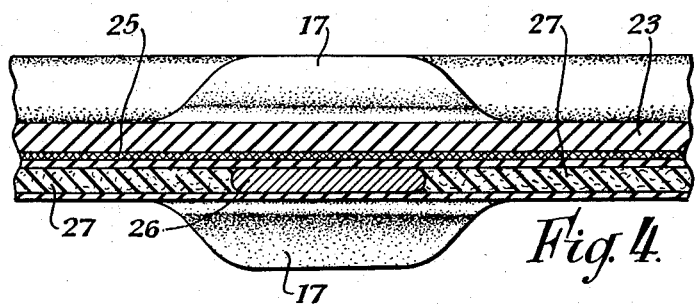
Figure 4 is a fragmentary longitudinal section on the line 4—4 of Figure 3.
Figure 5:
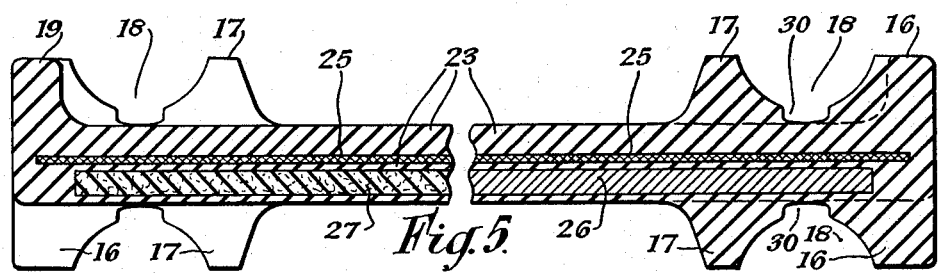
Figure 5 is a transverse section on the line 5—5 of Figure 3.
Figure 6:
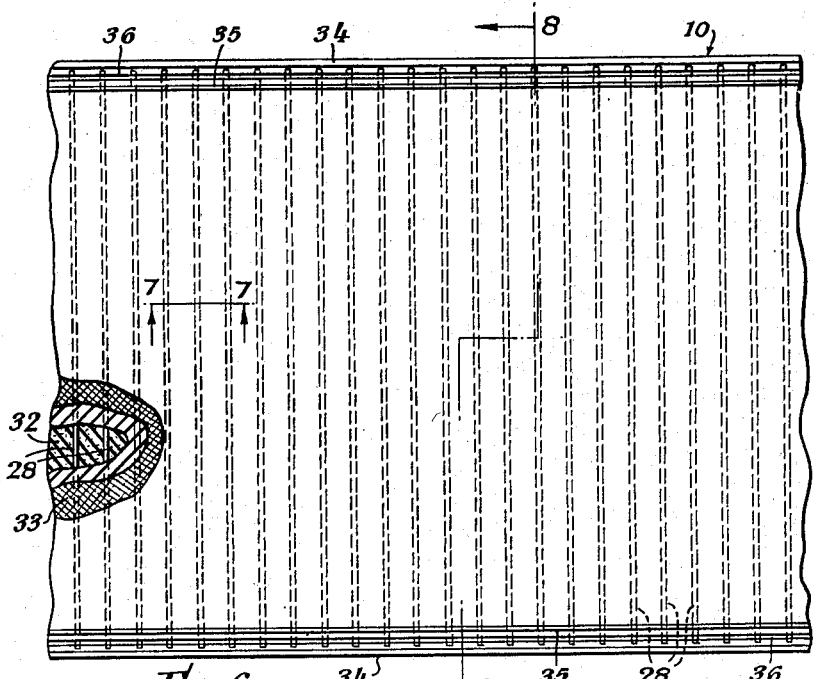
Figure 6 is a plan view of a part of a modified form of belt according to the invention.
Figure 7:
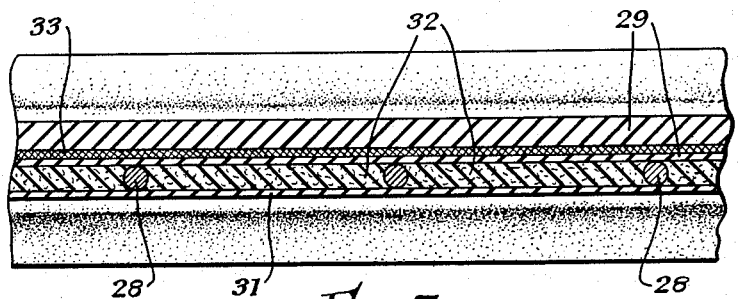
Figure 7 is a fragmentary longitudinal section on the line 7—7 of Figure 6.
Figure 8:
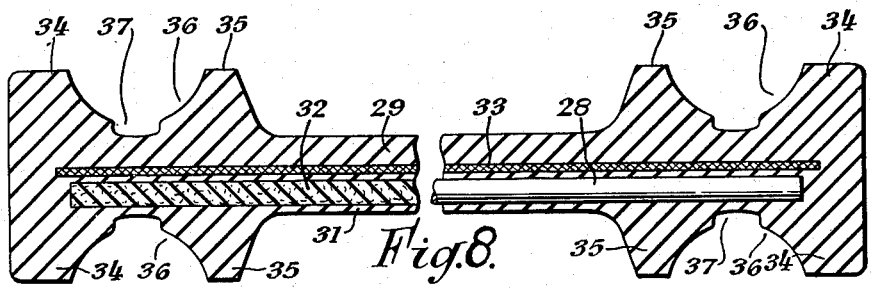
Figure 8 is a transverse section on the line 8—8 of Figure 6.

The belt shown in Figures 6 to 8 of the drawings differs from that shown in Figures 3 to 5 in that the straps 26 are replaced by round bars 28 of resilient metal such as spring steel, the bars 28, like the straps 26, being interposed between a thicker layer of hard-wearing flexible and resilient material 29, and a thinner layer 31 of the same material, and having the spaces between them filled as at 32 with similar material of inferior quality, the hard wearing material providing the full thickness of the edges of the belt, so that the bars 28 and filling material 32 are completely enclosed in an envelope of the hard wearing material. The thicker surface layer 29 is reinforced with cotton duck at 33. Each longitudinal edge of the belt is thickened to provide continuous longitudinal ribs 34 on both sides of the belt, and a second rib 35 is provided on each side adjacent each rib 34, each rib 34 and the adjacent rib 35 defining between them a longitudinal groove 36 of substantially arcuate cross-section. A recess 37 is provided in the base of each groove 36 so that contact with the cables is made only at the sides of the groove.

The conveyor belt according to the invention is made in lengths which are coupled together when they are mounted on the cables of a conveyor, conveniently by providing interfitting fingers on the ends of each length of belt, which fingers are apertured to receive transverse connecting members similar to the straps or bars embedded in the belt.

In my United States patent application Serial No. 337,415, filed February 17, 1953, I have described a cable-belt conveyor in which a driving unit is arranged between the head and tail ends of the conveyor, each cable forming a local circuit at the driving unit, and being displaced laterally by its passage through the said local circuit. In order to enable the two forms of belt herein described to be used in a conveyor having such a driving unit, they are modified as shown respectively in Figures 9 and 10, which are perspective views of fragments of the belt in the position which they occupy on the return run of the conveyor. As shown in Figure 9, a third lug 38 is provided on the inner side of each lug 17 of each cable-engaging member 21 in the form of belt shown in Figures 1 to 5, and, as shown in Figure 10, a third rib 39 is provided, on the inner side of each rib 35 on one face of the belt, in the form of belt shown in Figures 6 to 8.

In the belt according to the present invention, the cable-engaging means are integral with, and within the width of, the belt. The cross-straps or bars can therefore be totally enclosed in the belt, having no exposed ends which would be subject to corrosion. Separate shoes to engage the cables, which have hitherto been used in conveyors of this kind, are eliminated, and the overall width of the conveyor, for a given width of belt, is reduced. The span of the straps for a given width of belt is also reduced, enabling the cross section of the straps to be reduced. The belt is of uniform thickness, eliminating bumps as it passes round the drums at the ends of the conveyor, and enabling the cleaning lip of the discharge chute to be set more closely to the belt.

The elimination of separate cable-engaging shoes makes it economically practicable to have the cross straps or bars closely spaced, thus reducing the strength requirements of the belt itself due to the short longitudinal span between the straps or rods, and also reducing the sagging of the belt between the straps or rods. The amount of such sagging governs the size of the pulleys 14, since they must be large enough to ensure that the sage of the belt does not cause it to strike the pulley spindles. A reduction in the degree of sag therefore enables the pulley diameters to be reduced.

Another advantage resulting from the lesser degree of sag between the cross straps or bars is that the slope of the belt when the conveyor is inclined longitudinally is substantially uniform, instead of having a substantially greater slope just below each cross strap or bar and a lesser slope just above each cross strap or bar. The uniform slope tends to reduce the risk of rolling of material down the belt when the incline is steep.

In conveyors of the kind referred to having a relatively great longitudinal spacing between the cable-engaging means, and having means for reversing the relative positions of the belt and the cables at the ends of the conveyor so that the belt is supported by the cables on both the carrying and return runs, it is desirable either that the cable-engaging means on one side of the belt remain in engagement with the cables until the cable-engaging means on the other side have come into engagement with the said cables, or that guiding means be provided to ensure that the cable-engaging means are properly picked up by the outgoing cable. In the former case, it is necessary for the belt to follow the cables closely round pulleys at the ends of the conveyor, the diameter of which is necessarily large due to limited flexibility of the cables. The belt must therefore pass round large drums, and the material leaving the conveyor at the discharge end has a long drop on to the discharge chute, which must be below the centre of the drum. The belt according to the present invention, having cable-engaging means which are continuous as shown in Figures 6 to 8 or at very small intervals as shown in Figures 1 to 5, can be led away from and back to the cables, without the use of guiding means, there being no risk that proper re-engagement will not take place, and can therefore be led round a much smaller drum at the discharge end of the conveyor, reducing the drop of the material on to the delivery chute and thus reducing the degradation of the material.

I claim:

1. In a conveyor system including a belt and cables for supporting and propelling the belt, the improvement that comprises transversely extending resilient metal cross members embedded in a belt of rubber-like material, longitudinally spaced pairs of lugs on each surface of the belt adjacent the edges thereof, each pair of lugs defining between them a groove to receive a supporting and propelling cable, and a continuous rib along each edge of the belt on one surface thereof.

2. In a conveyor system including a belt and cables for supporting and propelling the belt, the improvement that comprises transversely extending resilient metal cross members embedded in a belt of rubberlike material, longitudinally grooved cable-engaging means molded integrally with the belt on each surface thereof and adjacent both edges of the belt, the span of said cross members being at least equal to the spacing of the cables and the width of the belt being greater than the spacing of the cables and at least equal to the span of the cross members.

References Cited in the file of this patent

UNITED STATES PATENTS

| | | |
|---|---|---|
| 722,252 | Richards | Mar. 10, 1903 |
| 2,656,035 | Thomson et al. | Oct. 20, 1953 |

FOREIGN PATENTS

| | | |
|---|---|---|
| 601,625 | Great Britain | May 10, 1948 |